March 17, 1953 D. A. QUARLES 2,632,101

REDUCTION OF NOISE IN TRANSMISSION SYSTEMS

Filed Oct. 23, 1950 3 Sheets-Sheet 1

INVENTOR
D. A. QUARLES
BY H. O. Wright
ATTORNEY

March 17, 1953 D. A. QUARLES 2,632,101

REDUCTION OF NOISE IN TRANSMISSION SYSTEMS

Filed Oct. 23, 1950 3 Sheets-Sheet 2

INVENTOR
D. A. QUARLES
BY H. O. Wright
ATTORNEY

March 17, 1953 D. A. QUARLES 2,632,101

REDUCTION OF NOISE IN TRANSMISSION SYSTEMS

Filed Oct. 23, 1950 3 Sheets-Sheet 3

INVENTOR
D. A. QUARLES
BY H. O. Wright
ATTORNEY

Patented Mar. 17, 1953

2,632,101

UNITED STATES PATENT OFFICE 2,632,101

REDUCTION OF NOISE IN TRANSMISSION SYSTEMS

Donald A. Quarles, Englewood, N. J., assignor to Bell Telephone Laboratories, Incorporated, New York, N. Y., a corporation of New York Application October 23, 1950, Serial No. 191,538

11 Claims. (Cl. 250—6)

This invention relates to radio and other carrier-wave transmission systems and, more particularly, to methods of and means for reducing interference produced by impulse noise in such systems.

Interference may be produced in general in radio receivers by noise peaks of extremely short duration whose amplitude is substantially higher than that of the carrier of the transmitted signal. Common sources of such impulse noise are numerous. For example, this noise is caused by thermal or shot-effect noise in vacuum tube amplifiers and their associated components, by industrial electronic devices, or by natural atmospheric conditions. In mobile radio systems, the noise produced by gas engine ignition or precipitation on the wings of an airplane presents a serious problem and has, in many cases, proved to be a limiting factor in such systems.

The effect of impulse noise having an amplitude substantially lower than that of the carrier can be reduced by employing the well known methods of frequency modulation or phase modulation, but this improvement is gained in such systems at a sacrifice of frequency space. The band width of the frequency-modulated signal must be increased to realize a noise advantage, thus trading frequency space for noise advantage.

It is an object of the present invention to reduce undesirable interference effects produced by impulse noise in carrier-wave transmission systems.

Another object is to improve the signal-to-noise ratio in carrier-wave transmission systems without substantially increasing the band width required by the transmitted signal.

While there have been devised numerous noise suppressor circuits operating in the audio section of the receiver system to suppress noise pulses that have an amplitude greater than the instantaneous amplitude of the desired audio signal, these systems are ineffective to reduce noise of amplitude less than the signal, which noise may, in many cases, be likewise undesirable.

It is a further object of the invention to reduce undesirable interference effects in the audio system produced by impulse noise having an amplitude less than the instantaneous amplitude of the desired audio signal.

These and other objects are accomplished in the specific embodiments of the invention to be described by modulating the transmitted carrier wave both in amplitude and frequency by the same intelligence signal, separately detecting the amplitude and frequency modulations of the transmitted wave at the receiver, obtaining a difference component between the separately detected modulations representing the noise in the system, obtaining a sum component therebetween representing the intelligence signal and the noise, and employing the difference component to regulate the amplitude of the sum component.

The nature of the present invention and its various objects, features, and advantages will appear more fully upon consideration of the embodiments illustrated in the accompanying drawings and hereinafter to be described.

Figure 1:
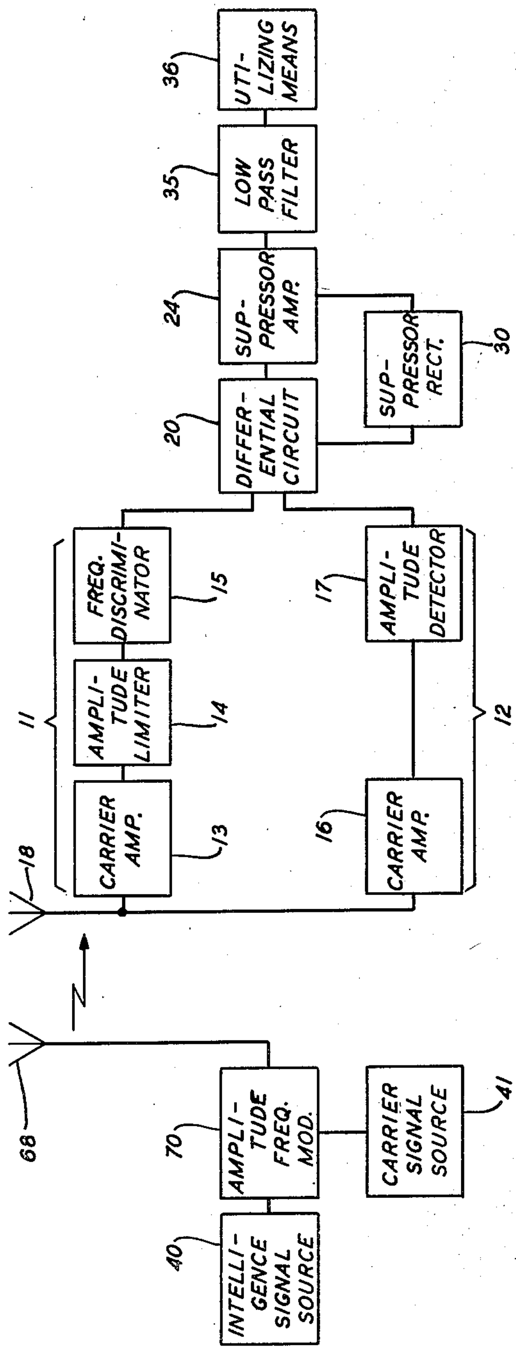
Fig. 1 shows in block diagram schematic the basic units of the proposed radio system.

In Fig. 1, a source of intelligence signals 40 to be transmitted without interference of noise effects is shown connected to an amplitude-frequency modulator 70, which modulator may be of the type to be described in connection with Fig. 3, and is suitably adapted to impress the intelligence signal upon a carrier wave from source 41 in both of two separate and distinct characteristic types of modulation to produce a complex high-frequency signal. For example, if the two characteristic types of modulation are those known as amplitude modulation and frequency modulation, the intelligence signal will be represented in the resulting complex signal by a definite amplitude relationship and also by a definite frequency relationship between the components which comprise the complex signal.

For the purpose of clarity in the following specification and in the appended claims, it will be necessary to distinguish between the manner in which the intelligence signal is impressed upon the carrier, or the particular modulating operation, and the representation of the intelligence in the complex signal produced by that modulating operation. Therefore, the term "type of modulation" will herein refer to the modulating operation, while "modulation" will refer to the representation of the intelligence in the complex signal. Neither term will refer to the signal effecting the modulation.

Although the apparatus described above has been limited by way of example to amplitude type of modulation and frequency type of modulation as the dual modulation methods employed in accordance with the invention, it should be pointed out that any type of wavelength modulation may be substituted for the frequency type of modulation, for example, phase modulation.

The complex signal produced by amplitude-frequency modulator 70 is radiated by antenna 68 for propagation through the atmosphere to antenna 18 of the desired radio receiving station. This type of propagation has been chosen to illustrate the invention, since it presents a far more serious problem with regard to interference noise than do the guided propagation systems of the wave-guide or coaxial type, but the principles of the invention are equally applicable to either of the latter as well.

The receiving station may be divided into five general sections for the purpose of discussion as follows: a channel 11 adapted to detect the frequency modulation, a channel 12 adapted to detect the amplitude modulation, a differential circuit 20, a suppressor rectifier 30, and a suppressor amplifier 24.

The frequency modulation channel 11 may be conventional in design, comprising, for example, carrier amplifier 13 for amplifying the complex signal, amplitude limiter 14 adapted to eliminate the amplitude variations in the signal without affecting the frequency variations thereof, and frequency discriminator 15 adapted to detect the frequency variations in order to reproduce the frequency modulation carried thereby.

The amplitude modulation channel 12 may comprise a carrier amplifier 16, and an amplitude detector 17 to reproduce the amplitude modulation carried by the complex signal, both units being of conventional design. If desired, a common carrier amplifier may be used for both channels.

The complex signal wave transmitted by antenna 68 is received in antenna 18 and applied concurrently to amplifier 13 of the frequency modulation channel 11, and to amplifier 16 of the amplitude modulation channel 12. The demodulated outputs of each channel are applied to differential circuit 20.

Differential circuit 20 is suitably adapted to obtain a sum and a difference component between the demodulated output of discriminator 15 and the demodulated output of amplitude detector 17. Numerous circuits having this property may be designed by those skilled in the art, but for the purpose of complete explanation of the present invention, one embodiment which seems particularly so adapted will be described in detail hereinafter with reference to Fig. 2. As will be immediately shown, the sum component will comprise the intelligence signal frequencies from each channel combined in phase with increased amplitude and the noise from each channel in substantially the same amplitude as the noise appeared in either channel alone, thus realizing substantially a three-decibel improvement in the signal-to-noise ratio in the sum component.

The difference component will comprise, as will be immediately shown, the noise appearing in both of the channels, separated from the signal components. In accordance with an object of the invention this difference component is rectified in suppressor-rectifier 30 and recombined with the sum component in suppressor-amplifier 24 in such a manner that the resulting momentary amplitude of the sum component is decreased in accordance with the amplitude of the output of rectifier 30, thereby eliminating or substantially decreasing the remaining noise in the sum component. The signal thus improved is passed, through a filter 35 to further remove undesirable noise having frequency components above the desired signal frequency, to utilizing means 36.

Having thus described in general the apparatus by which the objects of the invention are realized, the manner in which such apparatus will suppress or reduce undesirable interference effects caused by impulse noise in a radio transmission system may now be examined.

Random noise impulses introduced at some point in an ordinary radio transmission system will produce transient oscillations of a frequency equal to the mid-band frequency of the selective circuits in the receiver amplifier, and if the receiver is accurately tuned, this frequency is also equal to the carrier frequency. Since the demodulating circuit in a frequency modulation receiver responds to the rate of change of the phase angle of the carrier wave, the demodulated signal thereof is affected most by noise oscillations that happen to be in quadrature with the carrier. On the other hand, since the detector in an amplitude modulation receiver responds to the amplitude of the carrier, the demodulated output signal thereof is more affected by noise oscillations falling in phase with the carrier. If oscillations due to random noise, such as that produced by thermal agitation or shot-effect noise in amplifier tubes, are resolved into components in phase with the carrier and in quadrature therewith, the resolved components will be independent random variables. Thus, the noise response produced by these oscillations in the frequency modulation receiver will be statistically independent of the noise produced in the amplitude modulation receiver. Similarly, if the noise interference comprises a train of impulses of brief duration compared to the intervals between the impulses, such as interference caused by gas engine ignition systems, the phase relation between the transient oscillations produced by a given impulse and the carrier depends entirely upon the time at which the impulse arrives. Since this time of arrival is fortuitous, the noise produced in the frequency modulation receiver is again statistically independent of that produced in the amplitude modulation receiver.

Noise oscillations that happen, under unusual circumstances, to have a phase displacement with respect to the carrier at the 45-degree angle between an in phase and a quadrature relation may produce noise of the same magnitude in the frequency modulation and amplitude modulation receivers, but there will be a difference in wave form of the oscillations received over the two receivers. This wave form difference results from the fact that the demodulating means in the frequency modulation receiver responds to the time rate of change of the phase shift in the carrier caused by the noise, whereas the phase shift itself is proportional to the change in the carrier amplitude to which the detector of the amplitude modulation receiver responds. Thus, the wave form of the noise response of the amplitude modulation receiver is in effect a time variable, and the wave form of the noise response of the frequency modulation receiver is its derivative.

Thus, the noise components in the output signal of a frequency modulation receiver are distinct and different from the noise components in the output signal of an amplitude modulation receiver. On the other hand, the components of the intelligence signal in the output of each receiver are substantially identical.

Figure 2:
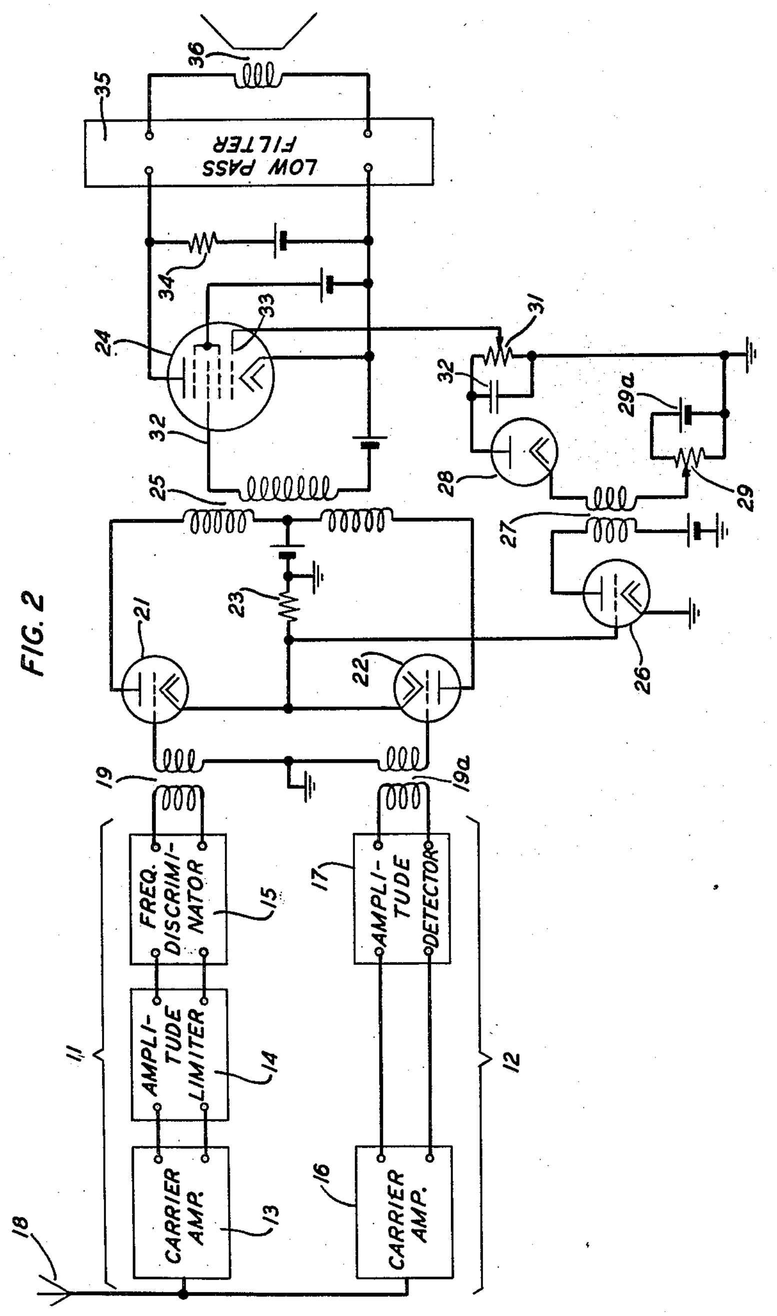
Fig. 2 shows in detail a radio receiver in accordance with the invention.

With these principles in mind the exact operation of the combined amplitude modulation and frequency modulation receiver may readily be understood with reference to Fig. 2.

The complex signal wave transmitted by an amplitude frequency modulating transmitter is received by antenna 18 and applied concurrently to amplifier 13 of frequency modulation channel 11, and to amplifier 16 of amplitude modulation channel 12.

The limiter 14 in frequency modulation channel 11 eliminates or removes the amplitude modulation on the received carrier so that the detected signal represents the frequency modulation substantially as if the amplitude modulation component did not exist. On the other hand, amplitude modulation detector 17 is unaffected by the frequency modulation of the carrier wave and responds solely to the amplitude modulation. The demodulated signals of discriminator 15 and detector 17 are adjusted to be equal in amplitude, phase, and band width with respect to the intelligence signal by means of simple expedients known in the respective receiver arts.

The demodulated output of discriminator 15 is applied through transformer 19 to the grid of amplifier tube 21. The demodulated output of detector 17 is applied through transformer 19*a*, which is so connected that it will reverse the phase of the signal applied to the grid of tube 22, 180 degrees with respect to the output of detector 17 making the signal at the grid of tube 22, therefore, 180 degrees out of phase with the signal applied to the grid of tube 21.

Amplifier tubes 21 and 22, making up the differential circuit 20 referred to in Fig. 1, are connected in the usual push-pull configuration, having a common unbypassed cathode resistor 23 and a push-pull output comprising transformer 25. Thus, the signals from each channel are combined in phase in the secondary winding of transformer 25 to obtain a first component representing the sum thereof. The signal developed across the cathode resistor 23 will be the out-of-phase combination of the signal received from each channel producing a second component representing the difference therebetween. In view of the foregoing analysis, it is now seen that the first component in the secondary of transformer 25 will comprise the intelligence signal components from each receiver added directly in phase. On the other hand, the impulse noise from each channel, having substantial differences of phase or amplitude or both, will be added in random phase. This, of course, will give a signal-to-noise ratio improvement of three decibels over the signal-to-noise ratio of either receiver alone.

This improved signal is applied from transformer 25 to a second signal grid 32 of amplifier 24, where except for the operation of grid 33 to be described hereinafter, it is amplified in the usual manner, appearing across plate load resistor 34. The signal is then supplied through low-pass filter means 35 to utilizing means 27, which may be a loudspeaker, as shown, or other device designed to utilize the transmitted intelligence signal.

There still remains in the intelligence signal as applied to grid 32, the original noise which may contain sharp, high amplitude impulses that make listening, assuming that utilizing means 36 converts the intelligence signal to audible sound, unpleasant.

Depending upon the circumstances, the source of the disturbing noise, and many other factors that may not readily be anticipated, the listening qualities of the sound will be improved, either by decreasing the amplification of the signal circuit by an amount and a time duration proportional to the offending noise peak, or by completely eliminating the noise reproduced by the loudspeaker. The resultant effect is to substitute a moment of silence or near silence in the audible output in place of the impulse of noise which usually would mask the signal in any event. Since the noise is in most cases of very brief duration, the substituted silence will not cause noticeable interference, and in all events, it will cause less disturbance to a listener than a sharp, high amplitude noise pulse. Furthermore, a listening operator may desire neither of the above compensating effects if the impulse noise is below a certain level or threshold, but would desire one or the other of the compensating effects if the impulse exceeds a predetermined value.

It is therefore a feature of the invention to further improve the listening qualities of the audible output by any one or combination of the above compensating effects at the option of the listening operator.

The difference component which appears across cathode resistor 23 will contain only the random noise since the respective signal components from the receivers will be balanced out while the noise components, which are of different amplitude and phase, will not be balanced out. This difference component is amplified by tube 26 and applied through transformer 27 to a rectifier circuit comprising the series combination of the secondary winding of transformer 27, diode 28, diode load resistor comprising rheostat 31, and a variable bias source supplied by rheostat 29 and potential source 29*a*. The anode of diode 28 is maintained a certain potential negative with respect to its cathode by the bias source, determined by the position of the variable arm of 29. Thus, a sharp peak of positive potential noise will cause diode 28 to conduct only if the amplitude of the peak exceeds the value of the diode bias. When diode 28 does conduct it will develop a negative potential with respect to the cathode of tube 24 across rheostat 31. This negative potential is applied from the variable arm of rheostat 31 to a first control grid of tube 24. Thus, if a particular peak of noise exceeds the threshold value determined by the bias on diode 28, a negative potential will be applied to grid 33, decreasing gain of tube 24 and thus the amplification of the signal applied to grid 32. The amplification of tube 26 is large so that the full potential developed across rheostat 31 will completely block transmission through tube 24, with the smallest noise pulse which the operation may care to suppress. If a fraction of the potential across rheostat 31 is applied to grid 33, rather than the entire potential, the gain of tube 24 will be decreased by a momentary peak of noise rather than be blocked. In this manner a listening operator may choose the particular adjustments of rheostat 29, to determine the threshold of operation, and of rheostat 31, to determine the effectiveness of operation, to obtain the combination that most satisfactorily reduces the impulse noise interfering with reception of the desired intelligence signal.

Since the duration of the interference will be inversely proportional to the system band width, a small condenser 32 may be shunted across resistor 31, so that the time constant of condenser 32 and resistor 31 will be substantially equal to the reciprocal of the system band width.

It should be pointed out that the present system is not limited to suppressing noise impulses that happen to have an amplitude greater than the desired signal, but will likewise suppress noise impulses introduced by the transmission medium that have an amplitude less than the signal. This substantial advantage stems directly from the novel manner of obtaining the noise signal component used for the purpose of control, which manner is completely independent of the relative amplitudes of the noise and the signal in the audio system.

Figure 3:
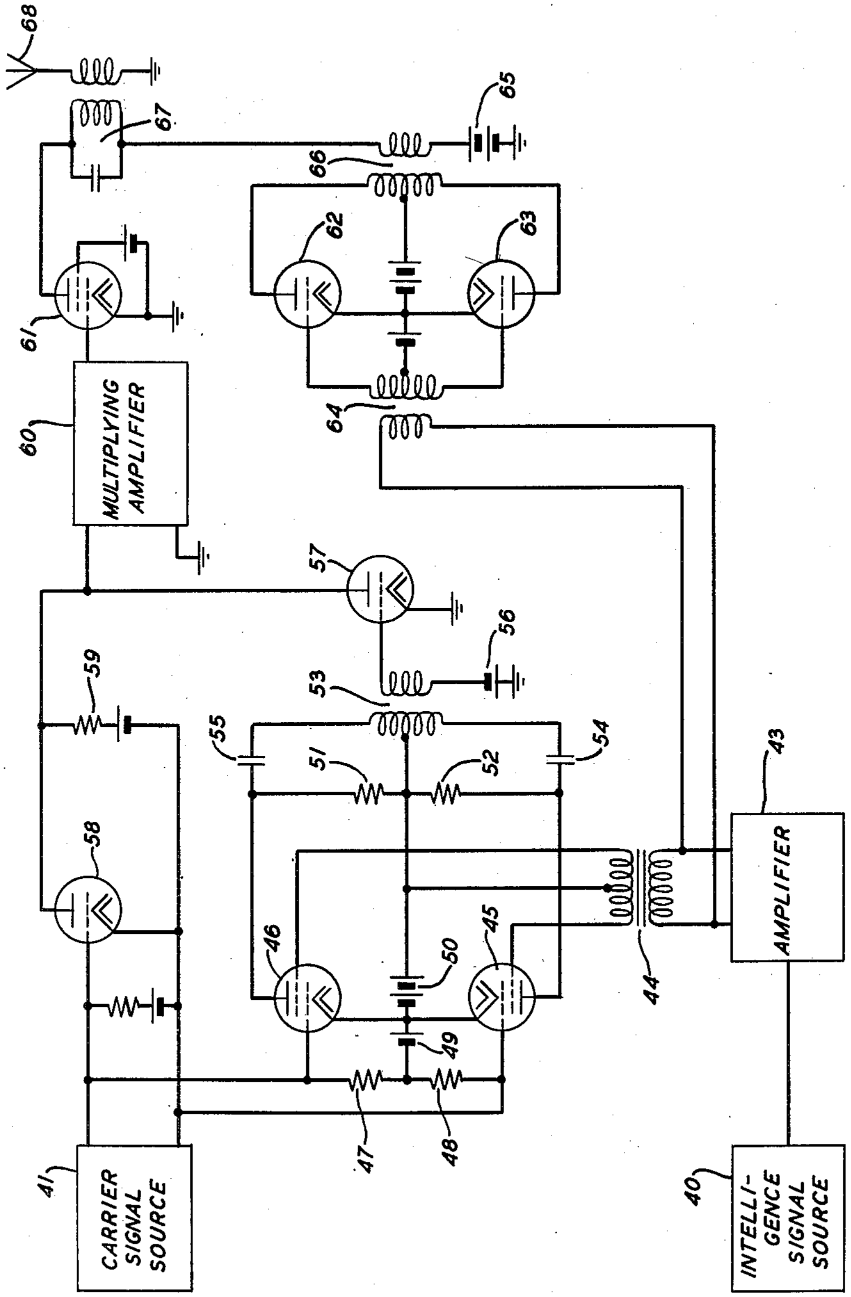
Fig. 3 shows in detail a radio transmitter in accordance with the invention.

In Fig. 3 an amplitude-frequency modulator in accordance with the invention is shown which will impress an intelligence signal upon a carrier wave in both amplitude modulation and frequency modulation to produce a resulting high frequency complex signal.

In particular as illustrated in Fig. 3, the output of carrier source 41, which may be for example a conventional crystal oscillator, is first phase modulated and then frequency multiplied a suitable number of times to convert the phase modulation to frequency modulation. The composite wave is then amplitude modulated. The output of the amplitude modulator can be high level in which case it is connected directly to the antenna 68 or the modulation may be affected at low level and amplified in a conventional power amplifier before energizing the antenna.

Considering first the operation of frequency modulation, the wave from signal source 40 is amplified by amplifier 43 and applied through transformer 44 to the second grids of a balanced amplitude modulator comprising tubes 45 and 46. At the same time, the carrier signal from source 41 is applied to the control grids of tubes 45 and 46. Resistors 47 and 48 provide a direct-current grid return through a source of bias potential 49. The resulting amplitude-modulated wave is taken from the load resistors 51 and 52 and applied to the primary winding of transformer 53 by coupling condensers 54 and 55. Direct-current source 50 supplies the plate power to tubes 45 and 46. The plate network comprising resistors 51 and 52, condensers 54 and 55, and transformer 53 is chosen to shift the phase of the amplitude-modulated wave 90 degrees before application to the grid of stage 57, biased by means of direct-current potential source 56.

The carrier signal from 41 is also applied to amplification stage 58 which has a plate load resistance 59 common with the plate circuit of stage 57. Thus the modulated wave from 57 is combined with the unmodulated wave from 58, and since the two waves have a 90-degree phase relation, the phase of the vector sum will vary in accordance with the amplitude change in the wave from stage 57.

The sum wave thus obtained is applied to multiplying amplifier 60, wherein the frequency is multiplied in accordance with conventional practice a number of times to convert the phase modulated wave into a frequency-modulated wave. A full explanation of this process and suitable circuits therefor are the subject of "Frequency Modulation," by August Hund, McGraw-Hill, 1942.

The output frequency-modulated wave from amplifier 60 is applied to the grid circuit of a typical plate-modulated amplifier 61. A portion of the signal wave from amplifier 43 is applied through transformer 64 to push-pull power amplifier comprising tubes 62 and 63, which power amplifier supplies the modulating voltage for modulation amplifier 61 by superimposing the modulating voltage upon the direct-current plate supply from 65 through transformer 66. This circuit is of conventional construction and may be designed in accordance with the arrangements shown in the "Radio Engineer's Handbook," by Terman, McGraw-Hill, 1943, at page 533.

Thus, the wave appearing in tank circuit 67 is both amplitude and frequency modulated by the signal from source 40 and this complex high frequency signal is suitable for radiation by antenna 68.

It should be noted that the band width of the amplitude channel should be adequate to pass the frequency spectrum of the frequency-modulated wave. With regard to the frequency modulation channel it may be noted that low deviation frequency modulation is desirable since a band of about twice the signal band width transmits practically all the desired energy. However, a deviation ratio of less than eight-tenths will result in little additional band saving. It is apparent therefore, that a band within this range is a substantial improvement over the band commonly required in conventional frequency modulation systems.

As pointed out above, the invention is by no means limited to amplitude type of modulation and frequency type of modulation since other combinations of wavelength modulations may be substituted for the frequency type of modulation.

In all cases, it is understood that the above-described arrangements are illustrative of the application of the principles of the invention. Numerous other arrangements may be devised by those skilled in the art without departing from the spirit and scope of the invention.

What is claimed is:

1. In an electrical signal transmission system, a source of intelligence signals, means for modulating a carrier wave by said signals in a first characteristic type of modulation, means for modulating said carrier wave by said signals in a second characteristic type of modulation, transmitting means connected to said modulation means to transmit said modulated carrier wave, receiving means adapted to receive said transmitted wave and to separately detect the modulation of each type, means for combining said separately detected signals in phase, means for combining said separately detected signals out of phase, and means for regulating the amplitude of the in phase combination inversely with respect to the amplitude of said out of phase combination, whereby said original intelligence signal is reproduced substantially undistorted.

2. In combination, a source of electrical intelligence signals to be transmitted through an impulse noise introducing transmission medium, a source of carrier signals, modulating means connected to said intelligence source and said carrier source, said modulating means adapted to impress said intelligence signal upon said carrier signal simultaneously in two different characteristic types of modulation, means connected to said modulator for launching said modulated carrier in said medium, reception means for removing said modulated carrier from said medium, demodulating means having two output circuits included in said reception means, said demodulating means selectively effective for each of said modulation types whereby the intelligence signal impressed by one of said modulation types appears in one output circuit and the other of said modulation types appears in the other of said output circuits, circuit means connected jointly to said output circuits for combining the outputs thereof in phase with respect to said intelligence signal, differential circuit means connected jointly to said output circuits for combining the outputs thereof out of phase with respect to said intelligence signal, and suppressor means interposed in said combining circuit and connected to said differential circuit for blocking transmission through said combining circuit in response to signal amplitudes of said out of phase combination exceeding a predetermined value.

3. In combination, a source of electrical intelligence signals to be transmitted through a transmission medium, a source of carrier signals, modulating means connected to said intelligence source and said carrier source, said modulating means adapted to impress said intelligence upon said carrier as amplitude modulation and as frequency modulation, means for transmitting said modulated carrier through said medium, and means for receiving said carrier and reproducing said intelligence comprising, a frequency modulation receiver having an input circuit connected to said medium and an output circuit, an amplitude modulation receiver having an input circuit connected to said medium and an output circuit, a consolidating circuit connected to both said output circuits for obtaining a sum component of signals appearing in said output circuits and a difference component between signals appearing in said output circuits, and means connected to said consolidating circuit and responsive to said difference component for momentarily decreasing the amplitude of said sum component.

4. A double modulated carrier signal receiver comprising means for selectively detecting modulation of a first characteristic type, means for selectively detecting modulation of a second characteristic type, means for combining said first and second detected modulation in phase, means for combining said first and second detected modulation out of phase, and means for regulating the instantaneous amplitude of said in-phase combination inversely with respect to the amplitude of said out of phase combination.

5. A double modulated carrier signal receiver comprising means for selectively detecting modulation of a first characteristic type, means for selectively detecting modulation of a second characteristic type, means connected to both said detecting means for combining said first and second detected modulation in phase in a first circuit and out of phase in a second circuit, modulation utilizing means connected to said first circuit, and suppressor means interposed between said first circuit and said utilizing means and connected to said second circuit for momentarily blocking modulation transmission from said first circuit to said utilizing means when the amplitude of said out of phase combination exceeds a predetermined value.

6. A double modulated carrier signal receiver comprising a frequency modulation discriminator circuit having an output, an amplitude modulation detector circuit having an output, means connected to both said outputs for combining said discriminated modulation and said detected modulation in phase in a first circuit and out of phase in a second circuit, modulation utilizing means connected to said first circuit, and suppressor means interposed between said first circuit and said utilizing means and connected to said second circuit for momentarily blocking modulation transmission from said first circuit to said utilizing means when the amplitude of said out of phase combination exceeds a predetermined value.

7. A double modulated carrier signal receiver comprising an amplitude modulation detector circuit having an output, another detector circuit including a limiter and a discriminator and having an output, means for combining said first and second outputs in phase, means for combining said first and second outputs out of phase, and means regulating the instantaneous value of the in phase combination inversely with respect to the amplitude of the out of phase combination.

8. A double modulated carrier signal receiver comprising an input signal source, an amplitude modulation detector circuit having an output, another detector circuit including a limiter and a discriminator and having an output, means coupling the two detectors individually to said input signal source, means for combining said first and second outputs in phase, means for combining said first and second outputs out of phase, and means regulating the instantaneous value of the in phase combination inversely with respect to the amplitude of the out of phase combination.

9. A plurally modulated carrier signal receiver comprising an input signal source, means coupled to said source for selectively detecting modulation of a first characteristic type, second means coupled to said source but otherwise independent of said first detecting means for selectively detecting modulation of a second characteristic type, means for additively combining said first and second detected modulation, means for differentially combining said first and second detected modulation, and means for regulating the instantaneous amplitude of said additive combination inversely in accordance with said differential combination.

10. A plurally modulated carrier signal receiver comprising a plurality of separate detectors for selectively detecting modulation of individually characteristic different types, means for additively combining the outputs of the various detectors, and means for differentially combining the outputs of the various detectors, and means for regulating the instantaneous amplitude of the additively combined outputs inversely in accordance with the value of differentially combined outputs.

11. In an electrical signal transmission system, a source of intelligence signals, means for modulating a carrier wave by said signals in a first characteristic type of modulation, means for modulating said carrier wave by said signals in a second characteristic type of modulation, transmitting means connected to said modulation means to transmit said modulated carrier wave, receiving means adapted to receive said transmitted wave and to separately detect the modulation of each type, means for additively combining said first and second detected modulation, means for differentially combining said first and second detected modulation, and means for regulating the instantaneous amplitude of said additive combination inversely in accordance with said differential combination.

DONALD A. QUARLES.

REFERENCES CITED

The following references are of record in the file of this patent:

UNITED STATES PATENTS

| Number | Name | Date |
|---|---|---|
| 1,734,038 | Levy | Nov. 5, 1929 |
| 1,911,091 | Schriever | May 23, 1933 |
| 2,251,382 | Sziklai | Aug. 5, 1941 |
| 2,362,201 | Hathaway | Nov. 7, 1944 |
| 2,371,416 | Tunick | Mar. 13, 1945 |
| 2,383,847 | Crosby | Aug. 28, 1945 |
| 2,394,544 | Gottier | Feb. 12, 1946 |